Dec. 8, 1970     J. M. LINDSEY     3,546,478
BOREHOLE TOOL
Filed Nov. 15, 1968
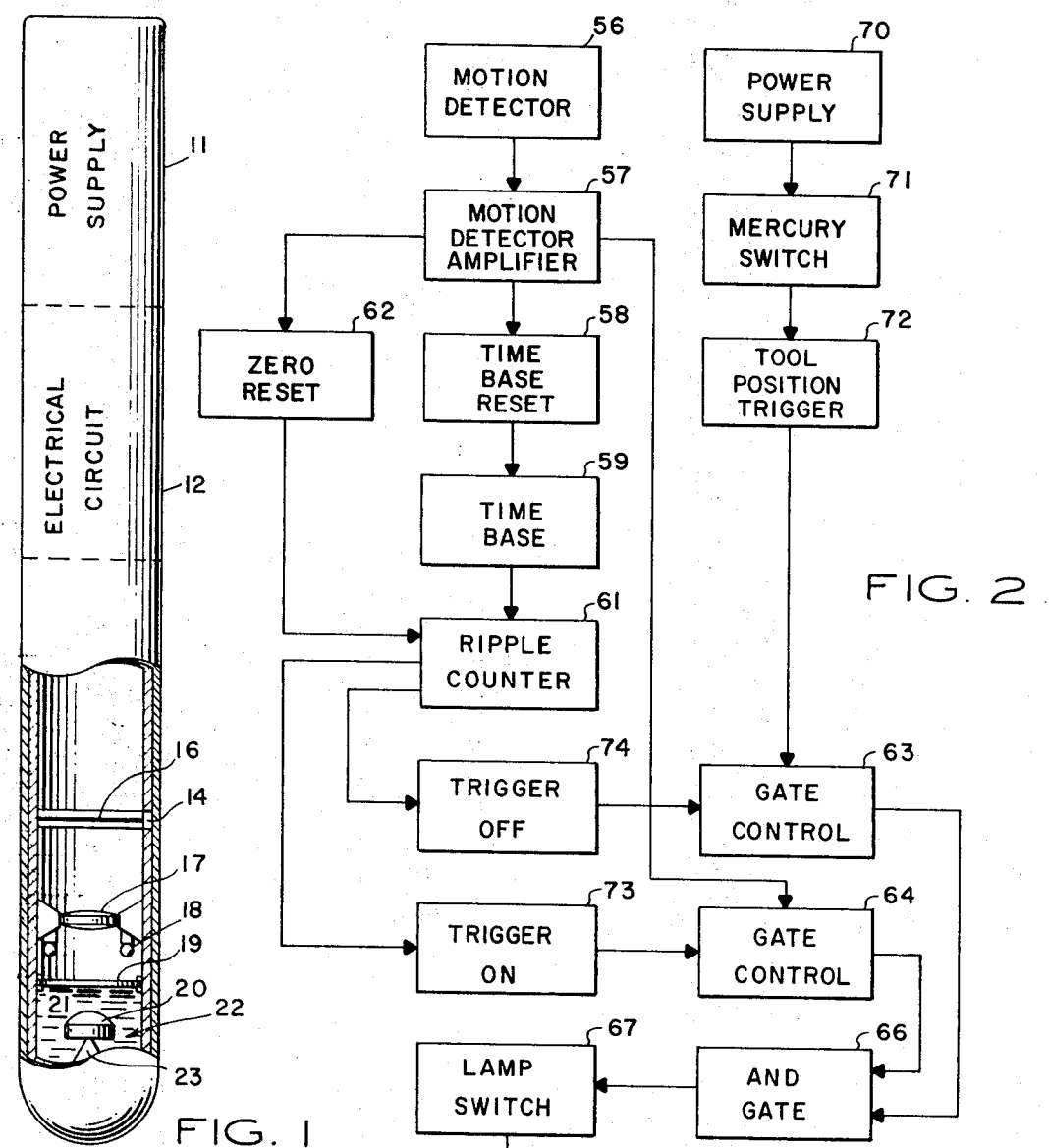
FIG. 1
FIG. 2
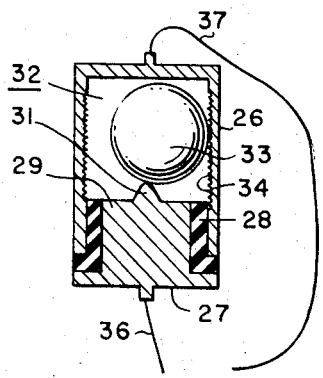
FIG. 3
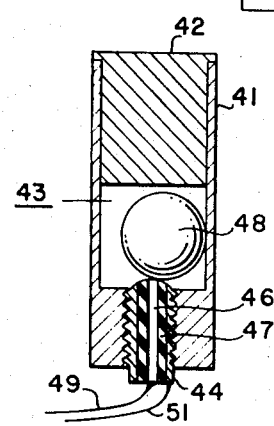
FIG. 4
INVENTOR
JAMES M. LINDSEY
*John E. Holden*
ATTORNEY

United States Patent Office 3,546,478
Patented Dec. 8, 1970

3,546,478
BOREHOLE TOOL
James M. Lindsey, Houston, Tex., assignor to Sperry Sun Well Surveying Company, Sugar Land, Tex., a corporation of Delaware
Filed Nov. 15, 1968, Ser. No. 776,184
Int. Cl. E21b *47/022*
U.S. Cl. 307—116          12 Claims

ABSTRACT OF THE DISCLOSURE

The particular embodiment described herein as illustrative of one form of the invention utilizes a motion sensing device to control the operation of a timing circuit in a downhole well tool. The absence of motion which is indicative of the tool being at its operating position, permits an electronic counting circuit to initiate signals for operating the tool. The tool will also not be operated when in a nearly horizontal or upside down position even in the absence of motion.

BACKGROUND OF THE INVENTION

The present invention pertains to a borehole tool and more particularly to a device for initiating the operation of such a tool upon its reaching an operating position in the borehole.

When making drill holes in the ground, particularly drill holes which run partly through rock and partly through looser earth layers, it often happens that the dip or inclination of the drill hole to the horizontal plane as well as the direction of the hole will vary quite considerably at different depths of the hole. In many cases, therefore, it is important to determine the existing deviations from a desired inclination and direction.

One such apparatus which has been used for the purposes outlined above is termed a single shot magnetic directional survey instrument. Such an instrument is used to obtain a single record of the inclination and the direction of inclination at various depths in a borehole. The instrument is used for the purpose of orienting a hole in directional drilling operations, and also to chart the course of boreholes from surface to total depth during a normal drilling operation. The directional features of the instrument consist of a magnetic compass. The inclination unit is a form of inverted plumbob. These two features are combined into a single compass angle unit which may be available in various ranges of degrees of inclination. A camera unit in the instrument makes a permanent record of the compass angle unit reading at a preset moment in time. Electrical power to operate lamps in the camera unit may be furnished by batteries or by a conductor cable suspending the instrument from the earth's surface. An electrical circuit for activating the lamps is controlled by a clock which allows a predetermined exposure period of a film disc for recording the inclination and direction of inclination indicated by the compass angle unit. An adjustment feature on the clock allows the clock to be set for delayed times ranging from one minute to several hours.

In operating such an apparatus, a desired compass angle unit is selected and assembled, and the batteries and film are loaded with the clock being set for the delayed time needed to reach the survey depth. The instrument is then assembled into a protective casing which can be lowered and positioned in a non-magnetic drill collar at the lower end of the drill stem with the apparatus being suspended on a wire line. Alternatively, the apparatus may be go-deviled into a non-magnetic drill collar and retrieved with an overshot or by pulling the drill string. The instrument may also be lowered into an open hole on a wire line, or by any other convenient method. The compass angle unit is normally comprised of a floating magnetic needle designed so that its directional and angular position may be simultaneously photographed on a disc.

Clock operated survey instruments must be assembled and programmed just prior to the survey since the clock must be set just before the instrument is placed in the well. This is due to the many contingent features that may occur in the drilling of a well which might delay the surveying of the well.

In order to set an appropriate delay time in the timing mechanism of the instrument, an estimation must be made as to the time it will take the instrument to be assembled and then either lowered into the wellbore on a wire line, or godeviled to the bottom. In any event, since the time lapse cannot be predicted with precise certainty, a liberal safety factor must be employed to insure that sufficient time will elapse to permit the instrument to be landed at the bottom of the borehole or at survey depth. In addition, time must be permitted for the instrument to cease moving or become quiet so that an accurate survey may be performed. Upon lapse of the predetermined time, a lamp circuit is activated which exposes the film that records an image of the compass angle unit.

Since a safety factor must be employed in determining the time for landing the instrument, a considerable amount of rig time may be used in the running of such a survey. If a directional hole is being drilled for example, and several surveys are run in the course of a day to determine the orientation of the hole, the rig time expended may become critical, particularly in situations such as offshore operations where rig costs are extremely high.

It is therefore an object of the present invention to provide a new and improved device for eliminating extra delay times presently involved in operating downhole well tools.

SUMMARY OF THE INVENTION

With this and other objects in view, the present invention contemplates an apparatus for initiating the operation of a downhole well tool, and includes a motion sensitive device which detects the presence of motion as the tool is being assembled and moved into an operating position in the wellbore. The motion detecting device prevents the operation of the tool as long as the tool is in motion. Upon cessation of such motion when the tool is located in the operating position, a solid state timing device is activated, which in turn causes an electrical signal to be sent to portions of the tool to be operated by such electrical signals. After a lapse of a predetermined period of time, the electrical signal is interrupted, whereupon the tool may be retrieved from the wellbore. The tool also includes a device which prevents the tool from operating after it is assembled and is motionless when the tool is nearly horizontal.

A complete understanding of this invention may be had by reference to the following detailed description, when considered in conjunction with the accompanying drawings illustrating embodiments thereof.

BRIEF DESCRIPTION OF THE DRAWINGS

FIG. 1 is a schematic view of an instrument for utilizing principles of the present invention;

FIG. 2 is a schematic diagram of an electrical circuit embodying principles of the present invention; and FIG. 3 shows a motion detecting device for use with the present invention; and FIG. 4 is an alternative embodiment of a motion detecting device.

DESCRIPTION OF THE PREFERRED EMBODIMENTS

Referring first to FIG. 1 of the drawings, a schematic view of a well surveying instrument includes at the upper end of the instrument a power supply section 11 which may be in the form of a battery pack or a power supply circuit receiving its power from a conductor cable (not shown) extending to the surface. Immediately below the power supply housing is a control circuit housing 12 which contains the electrical circuitry for operating the surveying apparatus. The lower section 13 of the tool houses the survey instrument and includes a slot 14 for receiving a film disc 16 for recording the survey. Below the film disc is a lens 17 with lamps 18 being positioned below the lens. A glass disc 19 which contains a reticle in its center is positioned below the lamps in the housing. The glass disc also forms the upper end of a chamber 21 containing a fluid in which a compass angle unit 22 is pivotally floated. Indicia on the head 20 of the compass angle unit provides a visual indication of the direction and inclination of the tool housing. The buoyancy of the fluid in the chamber maintains the compass angle unit in a vertical position on its pivot 23 throughout various positionings of the instrument housing in the wellbore.

In the operation of the instrument described above, the electrical circuit is activated at some instant of time to energize the lamps 8. The light emanating therefrom is directed through the glass disc 19 onto the head 20 of the compass angle unit 22. The compass angle unit includes a magnetic needle which is oriented in a north-south direction. In addition, the unit is permitted to tilt on its pivot 23 away from the longitudinal axis of the tool, to provide an indication of the inclination of the tool in the wellbore. Light impinging upon the head 20 of the unit is reflected back through the glass enclosure 19 and the reticle thereon, through the lens 17, and on to the film disc 16. Therefore, while the lamps are lighted, the film disc is exposed to the image presented by the compass angle unit head and the reticle engraved on the glass. The record of this image provides an indication of the direction and inclination of the borehole.

The present invention pertains to a device for initiating and timing the operation of an instrument such as a directional surveying instrument, however, it is pointed out that the timing circuit would have application to other types of wellbore tools.

The apparatus of the present invention incorporates in an electrical circuit, a motion sensing device such as the ones shown in FIGS. 3 and 4 of the drawings. The apparatus of FIG. 3 includes a conductive housing 26. The housing is open at one end for receiving a plug 27 made of a conductive material. The plug is separated from the housing by an insulator 28 to provide a pair of electrically insulated conducting surfaces. The plug 27 has an upwardly extending portion 29 which is also insulated from the housing, and which has a pivot point 31 at its upper end. The space between the upper end of the upwardly extending portion 29 and the top of the housing 26 forms a chamber 32 which is sized to receive a ball 33. The ball is constructed of chrome or other such electrically conducting material. The inside wall surfaces 34 of the housing 26 which surround the chamber 32 are preferably roughened or threaded to provide a multiplicity of contacting points thereon which renders the device more sensitive to motion thereof. The ball is received within the chamber 32 and in a motionless condition, the ball will rest on the pivot point 31 and against the inside roughened surfaces of the wall 34 of the housing. In this condition, the ball 33 establishes a conducting path between the plug 27 and the housing 26 which are furnished with respective contacts and conducting wires 36, 37. The roughened threaded walls of the housing form a more elastic surface to increase motion of the ball and thus sensitivity of the motion detector. As the ball rests upon the pivot 31 in the chamber 32, a slight movement of the instrument causes the ball to move on the pivot from one wall portion to the other, thus intermittently making and breaking a conducting path in an electrical circuit including wires 36 and 37.

Referring to FIG. 4 of the drawings, an alternative embodiment of the motion detecting device icnludes a partially hollow housing 41 constructed of a conductive material and having a plug 42 closing its upper end. The enclosed hollow interior of housing 41 forms a chamber 43 therein. A plug 44 is inserted through the bottom of the housing. The plug is comprised of a magnetic core material 46 which is insulated from the housing 41 by a cylinder of insulating material 47. The upper end of the plug and magnetic core is rounded with the rounded end being positioned at the bottom of the chamber 43. A conductive ball 48 is placed within the chamber 43 and pivots on the upper rounded end of the core 46 so that, in response to motion, the ball will change its position within the chamber. Such position changes cause minute variations in a magnetic field. A resulting EMF is generated which may be detected and amplified in the timing circuit as will be hereinafter described. Conducting wires 49 and 51 connecting with the core 46 and housing 41 respectively, transmit the generated EMF to appropriate circuitry for utilizing the signal.

Referring now to FIG. 2 of the drawings, a circuit is shown for utilizing signals from the motion sensitive devices described above for operating a well tool instrument. The circuit includes a motion detector 56 such as the one described above, which provides a signal indicative of motion of the tool to a motion detector amplifier 57. The motion detector amplifier amplifies the signal from detector 56 and feeds the amplified signal to a time base reset 58. The time base reset is a transistor switching circuit which keeps being shorted in response to signals from amplifier 57. When the time base reset conducts, an activating signal is fed to a time base circuit 59 comprised of a low frequency oscillator. When operating, the oscillator sends successive pulses to a counter 61. Counter 61 is comprised of a series of AC flip flops arranged in a ripple counter configuration. Another switching transistor circuit 62 forms a zero reset for the ripple counter. The motion detector amplifier provides a signal to the zero reset 62 which shorts the reset to prevent it from conducting. This in turn resets the ripple counter to zero.

First and second gate control circuits 63, 64 respectively, which are comprised of DC flip flops, each feed signals to an "and" gate 66 for controlling a lamp switch 67 for activating lamps 18 in the well instrument. The battery pack or power supply section of the tool provides a power supply 70 to the entire system, including a voltage applied across a mercury switch 71 in the circuit. When the tool is in a substantially horizontal or upside down position, the mercury switch is not conducting to cause the tool to be deactivated. This feature permits assembly of the tool at any location for transportation to a well site, since as long as the tool is in the horizontal or inverted position, the circuit is not operated. Upon raising the tool to an upright position, as will be its condition in a wellbore, current through the mercury switch is supplied to a trigger circuit 72. The tool position trigger 72 is a pulse shaping circuit which when activated sends a pulse to the first gate control 63. This positive input pulse to one side of the gate control 63 causes the gate control to conduct and thereby produce a positive output signal to one side of the "and" gate 66. The above circuitry establishes a means for satisfying the positional attitude requirement of the tool before the tool will operate. This condition will exist in the tool until an absence of motion is detected for a certain period of time, which in turn activates a circuit satisfying the no motion requirement of the tool before it will operate.

When the absence of motion occurs, the time base 59 is activated as described above, to start the ripple counter. As the counter "steps" through a predetermined time interval, for example twenty seconds, a first signal from the counter activates a pulse shaping circuit 73 which will hereinafter be referred to as the "trigger on" circuit. The output of the "trigger on" circuit 73 is fed to one side of the second gate control 64. This in turn causes the second gate control to provide a positive output to the other side of the "and" gate 66. This output to the "and" gate 66, together with the positive signal from the first gate conrol causes a zero potential to be applied to the "and" gate. The "and" gate is arranged to conduct in this condition and thereby activate the lamp switch and the lamps for operating the instrument.

After the lapse of a predetermined amount of time which for example would be required to expose a film disc, the ripple counter provides an output to activate a pulse shaping "trigger off" circuit 74. The output from the "trigger off" circuit 74 switches the first gate control 63 to an off condition, and thereby applies a negative potential to the one side of "and" gate 66. This condition closes the "and" gate and causes the lamp switch 67 to open and thereby cease the operation of the lamps 18.

Once this latter condition occurs, that is, the counter 61 completes its cycle of operation to activate the "trigger off" circuit, the first gate control 63 which is in a negative output condition cannot be changed, other conditions being the same, to produce a posiitve output to reactivate the "and" gate 66. Therefore, after the apparatus has operated a complete cycle, the tool must be retrieved from the wellbore and placed in a horizontal position to reactivate the mercury switch to pulse the tool position trigger 72 in order to reactivate the tool. This arrangement prevents a duplicity of operations of the lamp circuit, and thus a plurality of exposures in the photographic instrument system. In other words, the apparatus insures a single shot operation.

In the operation of an instrument circuit as described above, the time delays in the counter may be set for example as follows: The first "trigger on" signal from the counter may be caused to occur after the instrument has failed to detect motion for twenty seconds. The trigger on output pulse then causes the second gate control circuit 64 to complete a circuit through the "and" gate 66, and energize the lamp. The counter may be arranged to then maintain this condition for one minute, whereupon the "trigger off" circuit is activated to change the condition of the first gate control 63 so that a potential is received across the "and" gate 66, thus causing the lamp switch and lamps to be deactivated.

If, for example, after the motion detector 56 has detected five seconds of motionlessness, the time base reset will not be shorting out the time base. Therefore, the time base will send a low frequency signal to the ripple counter which in turn would count the five seconds. Again, for example, if after seven seconds of operation, motion is detected by the motion detecting device 56, the motion detector amplifier will cause the time base oscillator 59 to reset through the time base reset 58 and will also send a zero reset signal to the ripple counter 61 to cause it to be placed in its original condition for starting a new counting sequence. This condition will repeat itself until the ripple counter has operated for twenty seconds to activate the "trigger on" circuit 73.

In the apparatus described above, the "and" gate or lamp switch gate 66 requires a positive signal to be applied to both sides of the gate in order to cause the gate to activate the lamp switch by placing one side of the lamp switch at ground potential. Therefore, both the first and second gate controls must provide a positive output to operate gate 66. The first gate control 63 produces a positive output after receiving a pulse from the tool position trigger circuit 72 which positive output stays on the gate control until a pulse is supplied by the "trigger off" circuit 74. This pulse from the "trigger off" circuit 74 produces a negative output from the first gate control 63. The second gate control 64, on the other hand, when receiving a signal from the motion detector amplifier, supplies a negative output to the "and" gate. This negative output is maintained on the second gate control 64 until it receives a pulse from the "trigger on" circuit 73. This in turn changes the condition of the second gate control 64 to produce a positive output. When this occurs, both sides of the "and" gate are receiving positive signals which causes the lamp switch to be activated.

In the operation of the control circuit just described, upon raising the well tool to a substantially vertical position prior to inserting it into the well, the mercury switch 71 is activated to send a pulse from the tool position trigger circuit 72 to the first gate control 63, which in turn provides a positive output to one side of the "and" gate 66. At the same time, the motion detector, when detecting the motion which would normally be present while the tool is being assembled and positioned for running into the wellbore, will cause an output signal from the motion detector amplifier to the second gate control 64. The resulting output from the second gate control is negative. This condition of a positive output from the first gate control and a negative output from the second gate control prevents the "and" gate from activating the lamp switch. Such a condition will prevail until the second gate control 64 is changed to another condition by an output from the counting network. This will occur when the motion detector fails to detect motion for a period of time sufficient to cause the time base 59 to send pulses to the counter for twenty seconds, whereupon the "trigger on" circuit is activated to send a pulse to the second gate control 64. This in turn produces a positive output from the second gate control and places the "and" gate in a condition to activate the lamp switch. The counter continues to step for one minute, whereupon a second signal is sent to the "trigger off" circuit which changes the condition of the first gate control 63 to a negative output. This negative output causes the "and" gate 66 to deactivate the lamp switch and cease operation of the lamps.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. In a wellbore tool, apparatus for initiating the operation of an electric circuit in the tool upon positioning of the tool at its operating position in the wellbore, which apparatus comprises: means for sensing the presence of motion of the well tool; and means responsive to the absence of such motion for initiating the operation of the electrical circuit in the well tool in the wellbore.

2. The apparatus of claim 1 wherein said motion sensing means comprises; a housing having a cavity; a ball in said cavity and arranged for movement therein; a pivot upon which said ball is supported; and means electrically insulating said pivot from inner walls of said housing cavity, said pivot, cavity walls, and ball forming an electrical path.

3. The apparatus of claim 1 and further including electrical power supply means, circuit means for supplying electrical power to the well tool; and means for interrupting said circuit means in response to a predetermined time lapse after the initiation of the operation of the well tool.

4. In an apparatus for initiating the operation of a well tool function: counting means for initiating signals to start and stop an operation of the well tool after a predetermined time lapse from a zero time reference; motion sensing means for preventing operation of the well tool while said tool is in motion; time base means responsive to the absence of motion for initiating operation of said counting means; and means responsive to the presence of motion for resetting said counting means to a zero time reference.

5. The apparatus of claim 4 wherein said counting means is comprised of an AC flip flop circuit in the configuration of a ripple counter.

6. The apparatus of claim 5 wherein said means for initiating operation of said counting means includes a low frequency oscillator circuit which feeds pulses to said ripple counter.

7. The apparatus of claim 4 and further including switch means for preventing operation of the well tool when said tool is in an other than normal operating position.

8. The apparatus of claim 7 and further including a gate circuit for passing signals from said counting means to the well tool function, said gate circuit having first and second input means and an output means, and being operative to produce from control signals to the first and second input means an output signal for operating said well tool function.

9. The apparatus of claim 8 and further including first and second gate control circuits being operative to provide control signals to said gate circuit input means, said first gate control being operated by signals from said switch means and said counter and said second gate control being operated by signals from said motion sensing means and said counter.

10. In a wellbore surveying instrument having a lens and lamp system for photographing an instrument indicative of wellbore conditions, means for initiating and stopping the application of electrical power to the lamps in the system, which means comprises: motion detecting means for providing a signal in the absence of motion of the instrument; switch means providing a signal when the instrument is in a normal operating position to permit application of power to the lamps; means responsive to a signal from said motion detecting means for providing timed output pulses; counting means operated by said timed output pulses and producing first and second spaced output signals at a timed interval from a zero reference time; and gate circuit means operative in response to said first and second output signals and to signals initiated by said motion detecting means and switch means for initiating and stopping the application of power to the lamps.

11. In a borehole surveying apparatus having an electrically operated system for recording borehole instrument conditions, downhole means for recording a borehole parameter which is measured by a downhole instrument; means for sensing the presence of motion of the means; means for sensing the presence of motion of the well tool; and electrically operated means responsive to the absence of such motion for initiating the operation of the downhole recording means.

12. In a downhole operated borehole surveying apparatus having a photographic system including a lamp system for photographing an instrument indicative of borehole conditions, means for initiating and stopping the application of electrical power to the lamp system, which means comprises: motion sensing means; means responsive to said motion sensing means for preventing the application of electrical power to the lamp system; electrically operated control means responsive to the absence of motion for a first predetermined time period for applying electrical power to the lamp system for a second predetermined time period; and means for preventing the application of electrical power to the lamp system after said second predetermined time period has lapsed.

References Cited
UNITED STATES PATENTS

| | | | |
|---|---|---|---|
| 2,246,519 | 6/1941 | Jones | 33—205.5 |
| 2,414,702 | 1/1947 | Smith | 33—205.5 |
| 2,633,645 | 4/1953 | Young | 33—205.5 |
| 3,141,126 | 7/1964 | Bennett et al. | 200—61.45X |
| 3,163,856 | 12/1964 | Kirby | 200—61.45X |

ROBERT K. SCHAEFER, Primary Examiner

T. B. JOIKE, Assistant Examiner

U.S. Cl. X.R.

33—205.5